US 8,311,948 B1

(12) United States Patent
Lu

(10) Patent No.: US 8,311,948 B1
(45) Date of Patent: Nov. 13, 2012

(54) CONTENT CREATION, MONITORING AND SELECTION

(75) Inventor: Xiaolin Lu, Highlands Ranch, CO (US)

(73) Assignee: BOCOO Capital, LLC, Englewood, CO (US)

( * ) Notice: Subject to any disclaimer, the term of this patent is extended or adjusted under 35 U.S.C. 154(b) by 1283 days.

(21) Appl. No.: 11/892,368

(22) Filed: Aug. 22, 2007

(51) Int. Cl.
*G06Q 99/00* (2006.01)
*G06F 17/30* (2006.01)
*G06F 7/00* (2006.01)

(52) U.S. Cl. ................ 705/319; 707/728; 707/748

(58) Field of Classification Search ........ 705/1, 37, 705/300–418, 500, 26, 14, 14.61, 35; 725/9; 707/748, 728; 709/224
See application file for complete search history.

(56) References Cited

U.S. PATENT DOCUMENTS

| 7,143,089 | B2 * | 11/2006 | Petras et al. ............... 707/749 |
|---|---|---|---|
| 2005/0097613 | A1 * | 5/2005 | Ulate et al. ................ 725/86 |
| 2005/0159998 | A1 * | 7/2005 | Buyukkokten et al. ...... 705/11 |
| 2006/0085300 | A1 * | 4/2006 | Green ......................... 705/30 |
| 2007/0050372 | A1 * | 3/2007 | Boyle ......................... 707/10 |
| 2007/0055612 | A1 * | 3/2007 | Palestrant et al. .......... 705/37 |
| 2007/0282730 | A1 * | 12/2007 | Carpenter et al. ......... 705/36 R |
| 2008/0077568 | A1 * | 3/2008 | Ott ............................. 707/5 |
| 2008/0109296 | A1 * | 5/2008 | Leach et al. ................ 705/10 |
| 2008/0109491 | A1 * | 5/2008 | Gupta ....................... 707/104.1 |
| 2008/0120166 | A1 * | 5/2008 | Fernandez et al. ......... 705/10 |
| 2008/0140502 | A1 * | 6/2008 | Birnholz et al. ............ 705/10 |
| 2008/0195459 | A1 * | 8/2008 | Stinski ........................ 705/10 |
| 2009/0007167 | A1 * | 1/2009 | Artom ......................... 725/9 |
| 2009/0037315 | A1 * | 2/2009 | Chu ............................ 705/37 |

OTHER PUBLICATIONS http://www.americanidol.com.
http://www.youtube.com/t/about, 2007.
http://www.myspace.com/index.cfm?fuseaction=misc.aboutus.
http://corp.brightcove.com/about_brightcove/overview.cfm.

* cited by examiner

*Primary Examiner* — Jami A Plucinski
*Assistant Examiner* — Bob R Chumpitaz
(74) *Attorney, Agent, or Firm* — Oliff & Berridge, PLC

(57) ABSTRACT

A content creation, monitoring and selection system establishes social networks for members such as content creators that generate creative content that may be placed in a content pool. The system assigns a profile for each member and provides social network services based on the profile. The system may also establish a content market. Creative contents may be placed in the content market with an asking price and prospective buyers may bid for ownership. Owners of content submissions may share the ownership by dividing up ownership rights and sell a portion of the ownership rights on the content market. By injecting market like mechanisms, the system may reduce risks associated with uncertainty of new products.

27 Claims, 14 Drawing Sheets

| Invitation | Genre | Content Title | Content Rank | Revision No. | Creator | Creator Rank |
|---|---|---|---|---|---|---|
| One Day in China | Drama | Up The Yangtze | 2 | 3 | Jones Brothers | 3 |
| One Day in China | Drama | Beijing Delight | 6 | 1 | Jennifer Dodge | 5 |
| ... | | | | | | |
| Hurricanes | Story | Swirl of Thunder | 4 | 2 | Jack Productions | 2 |
| Hurricanes | Story | Center Peace | 3 | 7 | Mike Logan | 1 |
| ... | | | | | | |

Fig. 5

| Title | Creator/Rank | Content Rank | Ask | Bid | Days to Close | | |
|---|---|---|---|---|---|---|---|
| Up The Yangtze | Jones Bro/3 | 2 | 1,000 | 1,000 | 10 | | |
| Beijing Delight | J Dodge/5 | 3 | 300 | 299 | 1 | | |
| Swirl of Thunder | Jack Prod/2 | 2 | 20,000 | 15,000 | 30 | | |
| Center Peace | M Logan/1 | 1 | 5,000 | None | 2 | | |

CONTENT CREATION, MONITORING AND SELECTION

BACKGROUND

Human creativity has contributed to the many faceted advances of human society. In particular, technological advances, especially in the last several centuries, has transformed human life in a very dramatic way. While human creativity has helped to generate profitable creative content in at least the modern society by organizations such as technology corporations and creative performance industries such as the movie industry, identifying profitable creative content has been full of uncertainty.

SUMMARY

A content creation, monitoring and selection system is disclosed that creates an incubator-like environment for generation of creative content to form a content pool. Content creators may be anyone in the public that becomes a member of the system by simply joining a social network established by the system. Once a member, the system assigns a profile for the member and provides social network services based on the profile. For example, the system may set a privilege status in the profile so that the member may gain entry to various forums or gain access to certain tools, for example.

A member may contribute to the content pool by making content submissions. When contributions are made, the system may upgrade the member status based on a grade level, for example. A grade level of 0 is automatically assigned to every new member. Upon a first contribution, the grade level may be increase to 1. The grade level may be increased or decreased based on any number of criteria so that content creators are encouraged to produce new and interesting creative contents for the content pool.

The system may also establish a content market where creative contents are priced. The public may be provided access to the content market so that consumers of products resulting from content submissions may be provided an opportunity to express their acceptance/rejection of particular content submissions. In this way, the risk of producing products based on specific content submissions may be mitigated.

Content submissions in the content pool may be selected to be placed in the content market with an asking price and prospective buyers may bid for ownership. After a preset period, the highest bidder becomes the new owner. The new owner may proceed to consume the content submission (e.g., use the content submission), proceed to produce a product such as a movie based on the content submission, or the content submission may be placed in the content market again with a new asking price.

Owners of content submissions may share the ownership by dividing up ownership rights and sell a portion of the ownership rights on the content market. In this manner, the content market may operate much like the stock market. A speculation market may also be established where option like contracts may be bought and sold for the rights to sell or buy shares of particular content submissions. By injecting market like mechanisms, the system may reduce risks associated with profitability uncertainty of new products.

BRIEF DESCRIPTION OF THE DRAWINGS

FIG. 5 shows an exemplary content pool;

DETAILED DESCRIPTION OF EMBODIMENTS

Although it can be said that every human being can generate creative content to some extent, discovering such creativity and converting the resulting creative contents into a moneymaking production has been difficult. Each year, many major movies are released where hundreds of millions of dollars are expended, but the box office success of each movie is uncertain until the actual release and acceptance by the consuming public. Thus, risk has been inherent in the process from creative talent identification to production of financially successful creative content.

This risk may be substantially reduced by taking advantage of new technologies made possible by the Internet, for example. As now apparent, the Internet provides a low cost communication medium that reaches substantially every sector of society. This expansive reach in combination with this medium's characteristics such as anonymity, nondiscrimination and inexpensive publication may be harnessed to reduce risks in identifying consumer acceptability of creative content. This harness may start by identifying creative talent.

However, consumer acceptability, thus monetary success, appears to be only loosely connected with creative talent. Recent phenomena such as "YouTube" and other "free" Internet platforms provide environments for free sharing of creative content. Very little money is made from the creative content itself. There appears to be no efficient mechanism for generating a profit stream from products based on the creative content. Instead, YouTube, My Space, and the like gain their financial support through advertisements from manufacturers that hope to gain sales from participants such as content creators themselves.

Similarly, off the Internet, American Idol is an example of talent identification based on opinions of a large cross section of society. Although using mainly the telephone and television technologies instead of the Internet, American Idol provides a level of confidence of consumer acceptance based on consumer voting. American Idol differs from the YouTube-like phenomena in that a very small sample of possible creative talent is accessed, but similar to YouTube in that monetary support for American Idol is mainly derived from advertisements.

Figure 1:
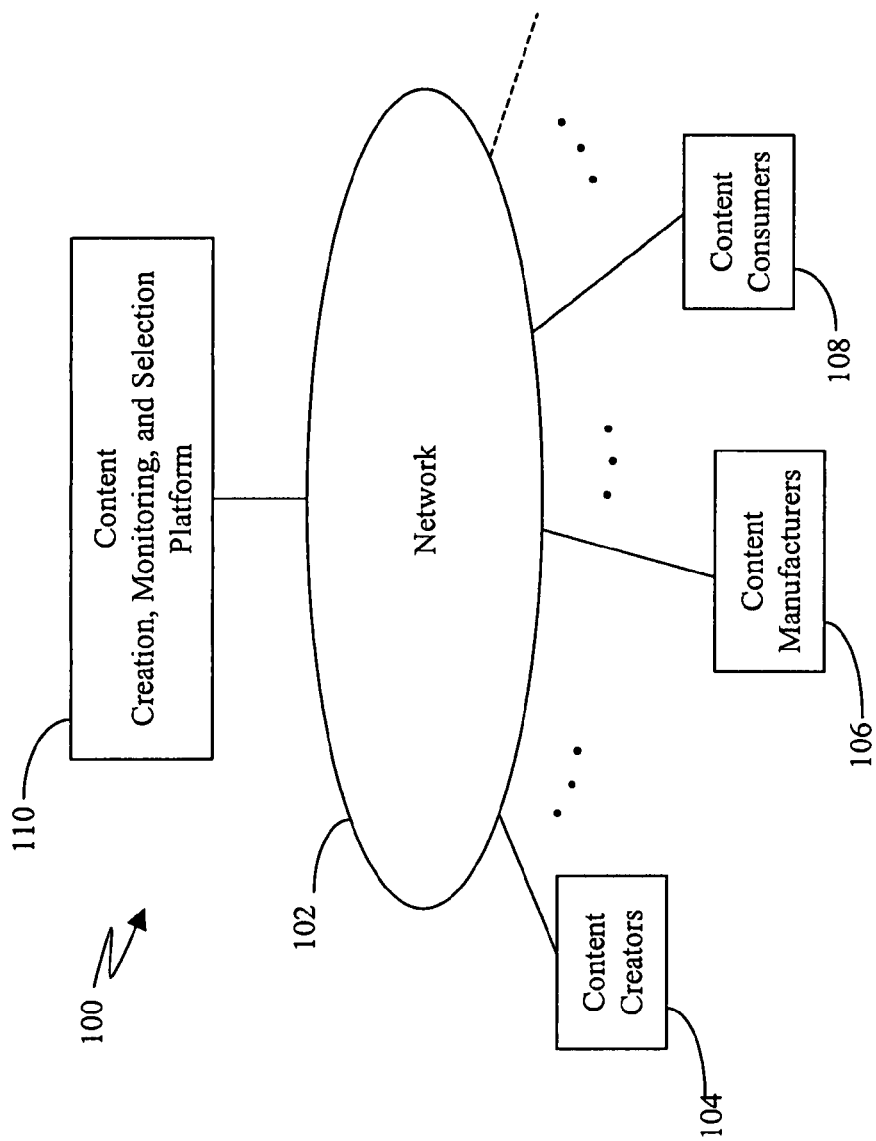
FIG. 1 shows an exemplary block diagram of a content creation, monitoring and selection system.

The content creation, monitoring and selection (CCMS) system provides one or more platforms that monetizes creative talent by systematically accessing massive amounts of creative talent available in the public and identifying profitable creative content generated by such creative talent. FIG. 1 shows an exemplary diagram of a CCMS system 100 that includes a network 102 such as the Internet, content creators 104, content manufacturers 106, content consumers 108 and a CCMS platform 110. While anyone in the public may participate as members in the CCMS system 100, for purposes of discussion, content creators 104, content manufacturers 106 and content consumers 108 are explicitly shown.

Content creators 104 may be those members of CCMS system 100 that add creative content either spontaneously or in response to various invitations that may be extended. Content manufacturers 106 may be businesses that participate for the purpose of purchasing candidate creative content for production. Productions may be output to the public through CCMS system 100 or through other channels. If output through CCMS system 100, content consumers 108 may be members that purchase the produced products and thus contribute to a monetization process of CCMS system 100. Other content consumers outside CCMS system 100 may consume productions output through other channels, such as video stores, video game stores, movie theaters, etc., for example.

CCMS platform 110 may support one or more social networks in which content creators 104 may participate. The social networks may be configured to attract content creators 104 for various contents of interest. For example, a social network may be related to gaming. Here, various content creators 104 may share new gaming ideas or prototype games for each other to play, criticize, or improve. Another social network may be directed to storytelling where content creators 104 submit various story lines for each other's perusal and comment. Similarly, other social networks may be supported where content creators 104 produce videos, songs, poems, slide shows, home security ideas, software techniques for 3-D display, electronic circuitry for performing various functions such as image processing for home security applications, etc.

A social network may provide a community environment for content creators 104 to easily create and share creative content so that each content creator 104 effectively has ready access to a publication system where other members of the social network, whether content creators or observers, may contribute by performing functions such as evaluating, making suggestions, and testing the creative content. In this way, those portions of society relevant to the subject matter of the social network may be reached. Thus, the social network becomes an incubator-like environment that encourages content creator 104 to thrive while immersed in the self motivating effects of free publicity and uninhibited opinions. In this way, social networks may be configured to take advantage of the anonymity and nondiscriminating characteristics of the Internet attracting content creators 104 of all ages, socioeconomic backgrounds, ethnic origins, etc.

While it is important to encourage free and unfettered sharing together with criticisms; constructive comments and substantially uncensored opinions being freely shared, CCMS platform 110 may introduce one or more structures in this otherwise unstructured environment to harness the freely exercised creative talent to generate potentially profitable creative content. For example, CCMS platform 110 may assign to each social network member a profile that includes member identification information and a grade level having values of between 0 and 10 among other information.

Initially, a social network member may be assigned a grade level of 0. When the social network member becomes a content creator 104, the grade level may be automatically upgraded to 1. If the content creator's creative content receives more positive than negative reviews, the grade level may be increased to 2, etc. Various different criteria may be associated with each of the grade levels so that social network members may be encouraged to increase quality and acceptance of their creative contents to gain higher status and respectability among fellow social network members.

For example, to gain a grade level of 5, a content creator 104 may be required to have contributed at least 10 creative contents that received a high rating based on a provider rating scale. A grade level of 7 may be only achieved by a content creator 104 whose creative content has actually produced monetary returns. A grade level of 10 may be assigned to content creators 104 whose creative content has resulted in one or more successful productions that generated over $10 million of profit, for example. Monetary rewards and increased status level among other peer content creators 104 may provide a natural motivation for content creators 104 to achieve higher and higher grade levels.

CCMS platform 110 may introduce further structure where content creators 104 may be given special privileges based on grade level. For example, content creators 104 having grade levels 5 and 6 may be assigned evaluator privileges where the evaluations of these content creators 104 are posted on an exclusive evaluator bulletin board with their evaluation comments optionally made available. Higher grade levels may be given further privileges. For example, content creators 104 of grade levels 7 and higher may be given expert status. Content creators 104 that receive positive ratings from expert content creators 104 may be permitted to join exclusive clubs where advanced content creation tools may be made available, and/ or special viewing privileges and/or specified editorial privileges are given, etc. Created content from these exclusive clubs may be given privileged status either in special presentations, or higher recommendations for opportunity of possible monetary rewards, for example.

Table 1 below shows an exemplary profile that may be stored in a content creator database, for example.

TABLE 1

| Member ID | Grade Level | No. of Submissions and Their Links | |
|---|---|---|---|
| Jones Brothers | 3 | 30 | |
| Jennifer Dodge | 5 | 2 | |
| Mike Logan | 1 | 6 | ... |
| . | . | | |
| . | . | | |
| Jack Productions | 2 | 20 | |

Structures such as discussed above engender an environment of active creative content production. Content creators 104 may be motivated to reach ever higher grade levels by generating more and more creative content so that creative content may be generated either spontaneously or by encouragement through introduced structures to form a content pool. CCMS platform 100 may extract creative contents from this content pool based on various criteria, for example, and the extracted creative content may be further selected for potential future productions.

For example, CCMS platform 110 may introduce a contest for creation of creative content directed to a particular subject matter. Content creators 104 may be motivated to participate in hopes of winning. Winners of the contest may be rewarded by special status designation, and/or be selected as candidates for access to forums that may lead to the possibility of a profitable production success, for example. However, creative contents that win a contest may not necessarily result in a profitably successful production. Thus, CCMS platform 110 may include further structural configurations such as an open market like process to select production candidates from the content pool.

Figure 2:
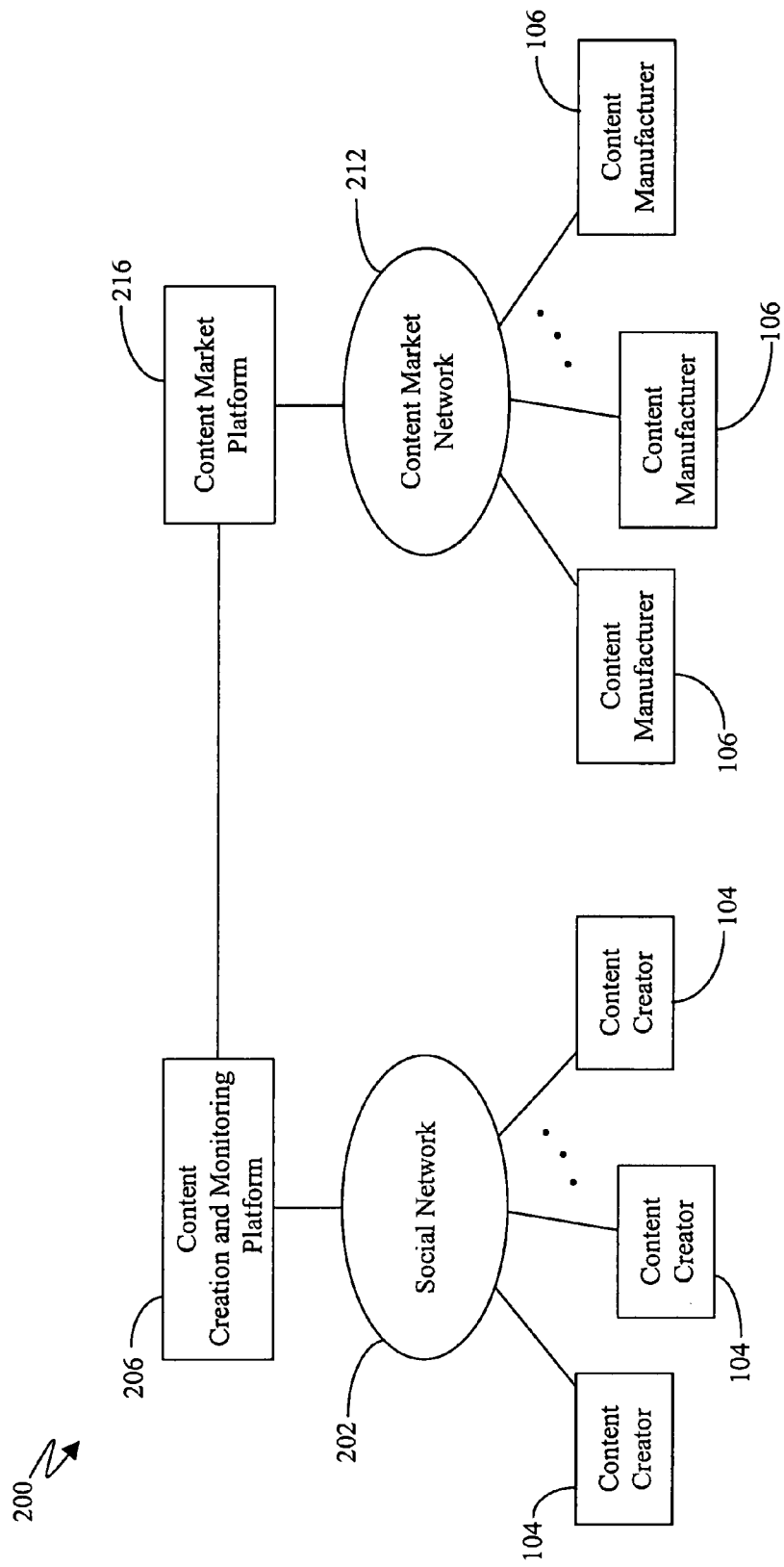
FIG. 2 shows an exemplary detail diagram of the content creation, monitoring and selection system.

CCMS platform 110 may be configured into two portions, for example. A first portion may provide structure that actively encourages creative content generation, as discussed above. A second portion may place selected creative content from the content pool in a content market for purchase by content manufacturers 106, for example. FIG. 2 shows an exemplary CCMS system 200 that includes social network 202 having content creators 104 as members. A content creation and monitoring (CCM) platform 206 controls social network 202 and extracts a content pool from which creative contents are selected as entrants to a content market of a content market (CM) platform 216. Content manufacturers 106 among others may be connected by a content market network 212 for purchasing or at least assigning values to creative content from the content market under various possible configurations, such as an auction configuration or a stock market like configuration, for example.

Figure 3:
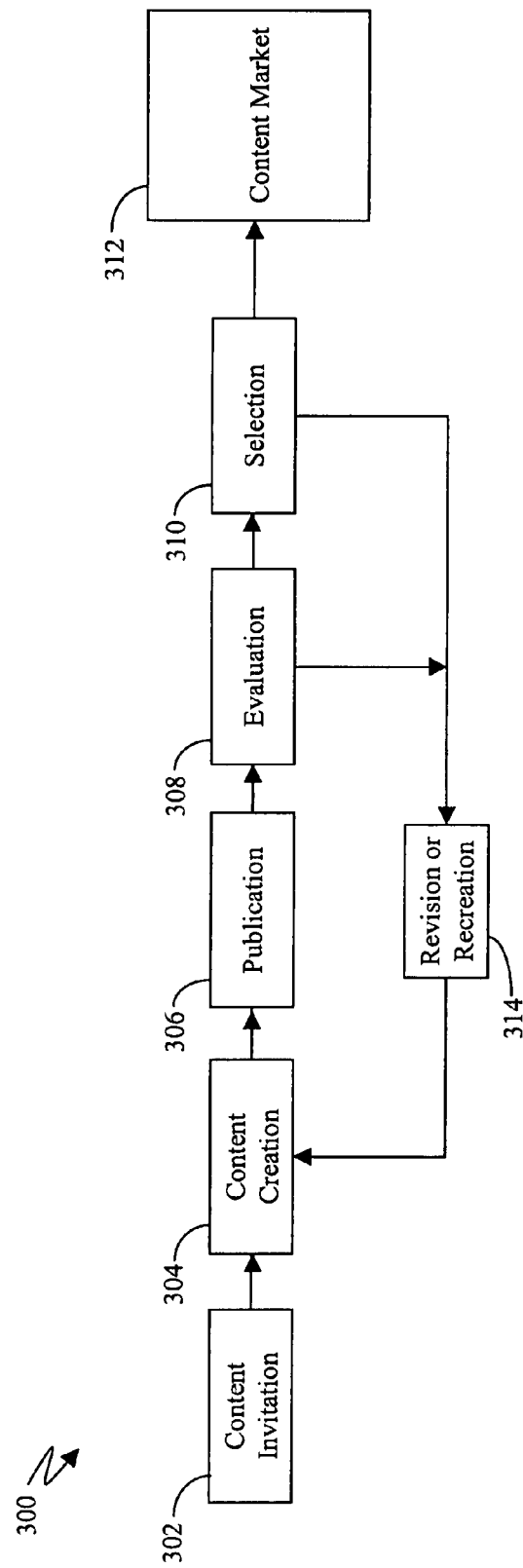
FIG. 3 shows a block diagram of an exemplary process performed by a content creation and monitoring platform.

FIG. 3 shows an example process 300 of CCM platform 206 for supporting structures such as a contest. In block 302, a content invitation is introduced into social network 202 to alert content creators 104 of a new content invitation for a contest, for example. The content invitation may state a subject matter of the contest such as a video drama entitled "One Day in China" or a story about hurricanes, for example. In block 304, content creators 104 create various content entries. As suggested above, content creators 104 may be anyone such as teenagers that enjoys putting together creative content just for fun or for showing off to their friends, or an amateur, semiprofessional, and/or professional group that is seriously trying to create a successful production.

In block 306, content creators 104 publish their created contents via websites established in social network 202, for example, officially submitted for publication in a specifically designed contest forum, etc. If a special forum is not used, CCM platform 206 may provide search engines for identifying contest entrants, or addresses of created content may be listed in a bulletin board, for example. In any case, CCM platform 206 may provide various structures for easily publishing contest entries and to gain publicity within social network 202.

Figure 4:
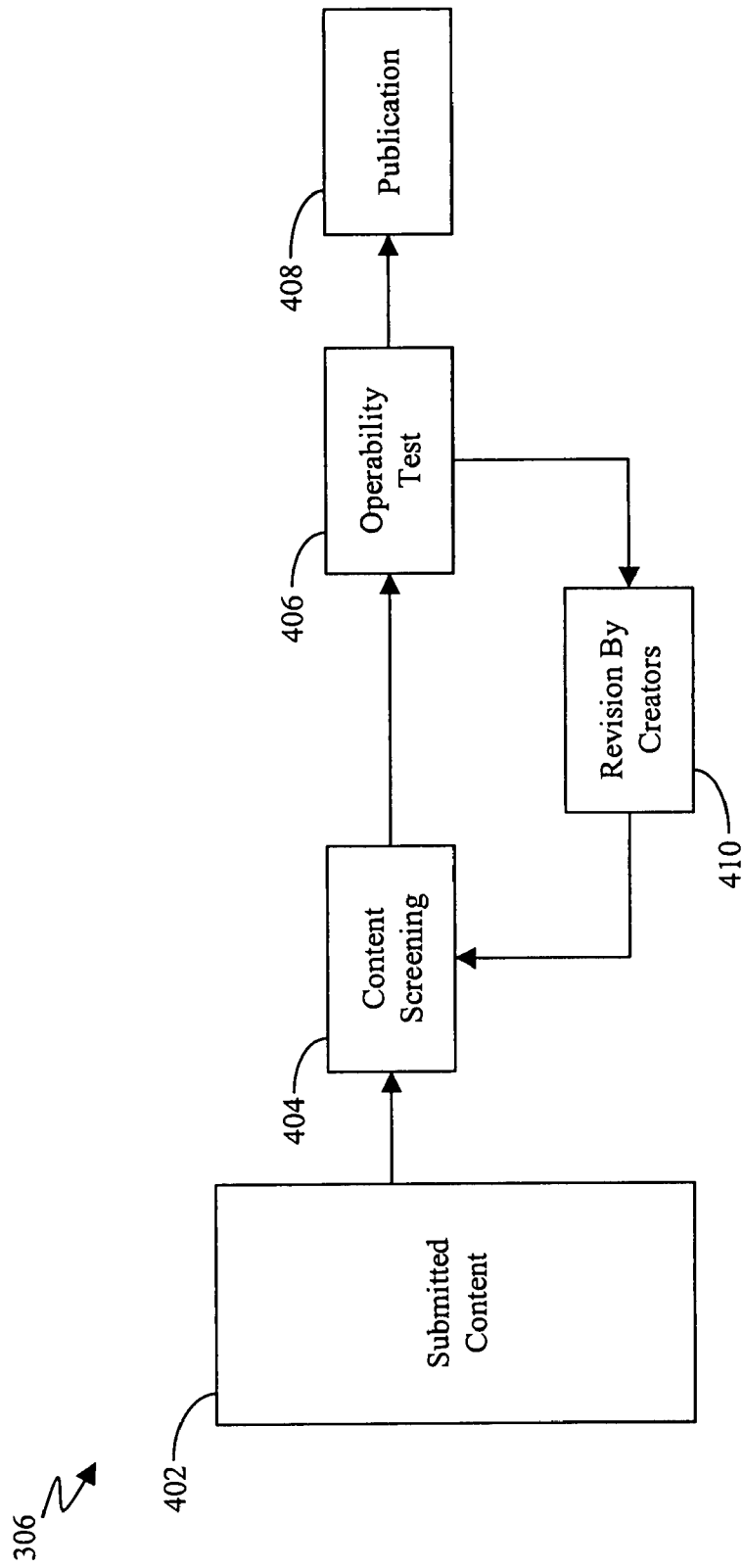
FIG. 4 shows an exemplary detail process for the publication block of FIG. 3.

FIG. 4 shows in greater detail block 306 that may include an exemplary process for formal submissions. Block 404 performs content screening of the content submissions of block 402 for appropriateness so that a desired level of quality is maintained. Block 406 performs operability test on the content submissions so that technical performance may be assured which further enhances the quality of the contest. If operability problems are detected, then offending content submissions may be returned to the appropriate content creators 104 for revisions before publication in block 408. CCM platform 206 may limit a number of revision cycles to maintain contest momentum. Where desired, technical assistance may be provided so that appropriate opportunities may be provided to worthy creative contents.

Once published, process 300 may submit the created content for evaluation in block 308. As noted above, the evaluation may be performed in many different ways. For example, members of social network 202 may all participate by simply voting using a voting structure such as an electronic ballot provided by CCM platform 206. Voting members may experience the content submissions by perusing or operating the publications and then entering their evaluations in a manner provided by CCM platform 206.

Additionally, the voting structure may provide for feedback comments so that more substantive remarks may be considered by the content creators 104 when making revisions in block 314. For example, CCM platform 206 may provide a simple checklist in recommended areas of evaluation. Evaluation categories such as quality, novelty, quality of story line if appropriate, level of creativity, presentation quality, usefulness, emotional quality, etc. may be included as well as providing room for comments.

CCM platform 206 may provide one or more structures to the evaluation process by organizing different categories of evaluators. For example, in addition to the voting by general participants of social network 202, content creators 104 of different grade levels may be given importance by giving greater weight to their votes. Higher evaluator categories may be established such as critics, professionals, content manufacturers, etc. Table 2 below shows an exemplary evaluator database that includes identification of various evaluators. CCM platform 206 may collect all the votes and evaluation results from all evaluators and process them using a formula that balances all sources of evaluations and generate a result that may assign points where higher point values are awarded to better content submissions.

TABLE 2

| Evaluator ID | Rank | Status | |
|---|---|---|---|
| George Lane | 2 | Expert | ... |
| Julie Ying | 1 | Professional | |
| . | | | |
| . | | | |
| . | | | |

In any case, after evaluation results are released, content creators 104 may choose to revise or recreate their content submissions and resubmit a new version. CCM platform 206 may establish a total number of revisions allowed, or put time limits on final submissions to facilitate progress of the contest. Winners may be awarded titles such as junior, amateur, senior, expert, etc. to provide peer status recognition. Other award mechanisms may also be used including monetary awards so that proper motivation may be provided consistent with desired participation levels. Further, winning content submissions and perhaps some high point non-winning content submissions may be candidates for further selection from the content pool in block 310 for entry into content market 312.

The content pool may be organized to display information associated with each content submission in the content pool. FIG. 5 shows an exemplary structure 500 where the content pool is represented in a table format. Rows of the table may be associated with each content submission and columns may be associated with information of the content submissions. For example, the information may include details such as the content invitation that a content submission is related to, the genre, the title of the content submission, the rank of the content submission that may be set based on evaluation results, the revision number of the current version, the content creator identification, the rank of the content creator 104 which may be set by CCM platform 206 based on historical performance of the content creator 104 such as the number of content submissions that received a rank of 3 or above, for example, etc. FIG. 5 shows two content submissions that respond to the "One day in China" content invitation and two content submissions that respond to the "Hurricanes" content invitation.

The information in the content pool may be updated as various content submissions are evaluated, revised, recreated, etc. Content submissions that are selected to be placed in the content market may be removed from the content pool. Also, CCM platform 206 may assign a time-to-live parameter to each of the content submissions so that a content submission is deleted from the content pool if the time-to-live expired. In this way, a dynamic flow of content submissions may be maintained in the content pool to avoid stagnation with old and unpopular content submissions.

Figure 6:
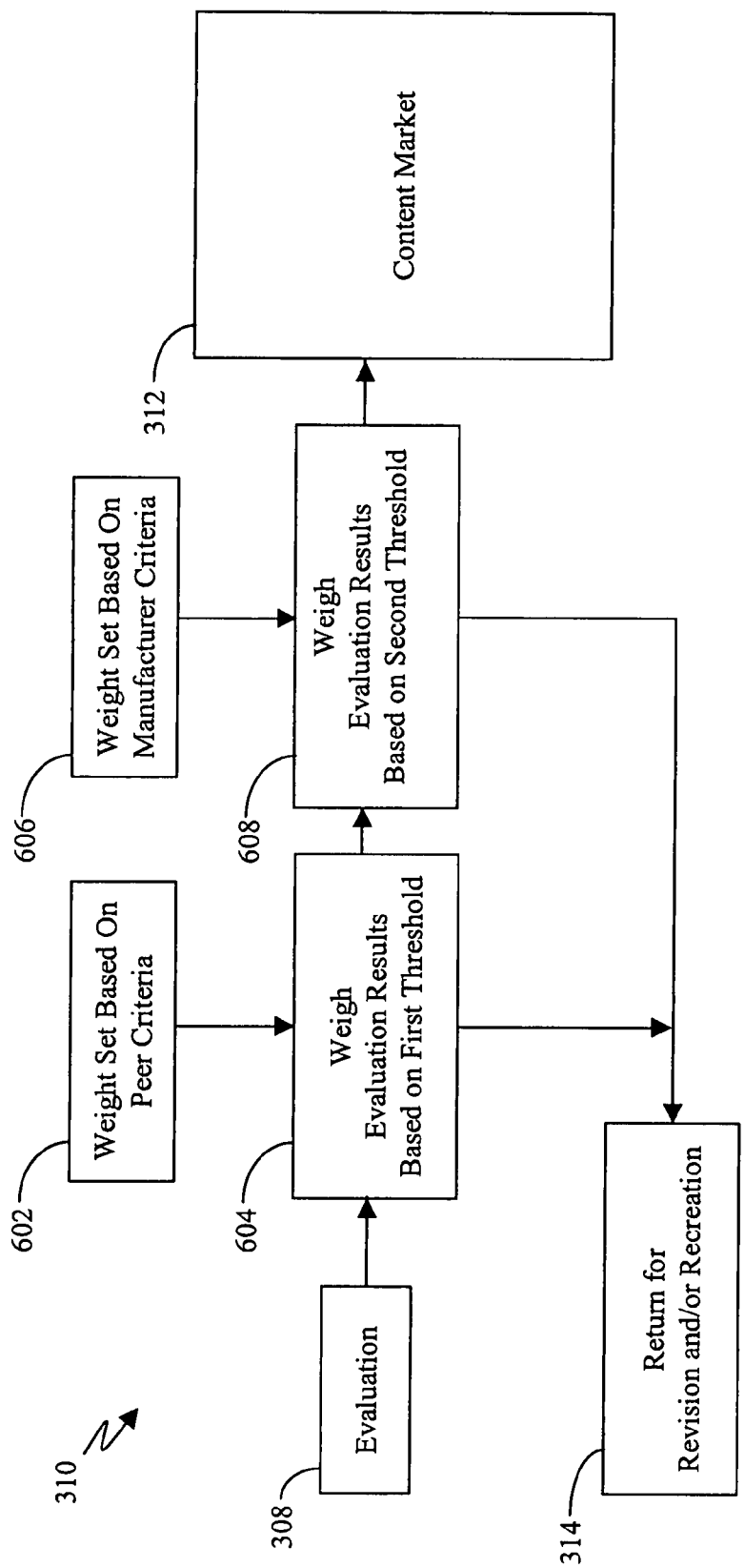
FIG. 6 shows an exemplary detail block diagram of the selection block shown in FIG. 3.

FIG. 6 shows a more detailed block diagram for an exemplary process for block 310 of FIG. 3. Block 310 may include block 604 that receives candidate content submissions from evaluations performed by block 308 and weighs the evaluation results using a weight set based on peer criteria to determine whether a content submission has sufficient peer points to exceed a first threshold. For example, peer criteria may include evaluation areas such as novelty, emotional content, violence, intrigue, complexity, level of creativity, market trend of this type of content, opinions of professional content creators, etc. A weight value may be assigned to each of these areas so that the sum of all weight values may equal to 100 for a maximum of 100 peer points based on peer criteria. Each evaluator may assign a percentage number corresponding to each of the evaluation areas. For example, an evaluator may assign a 75% for novelty, a 20% for emotional content, etc. Peer points for a particular evaluator may be equal to the sum of the products of each weight times the percentage value assigned by the evaluator.

Total evaluation for peer points may be determined by yet a second weighted formula where the peer points assigned by a particular evaluator is weighted by the status of the evaluator. Thus, as suggested above, evaluator grade levels of greater than seven may be given a much higher weight than evaluators having grade levels of less than five. The final value of peer points may then be compared to a first threshold to determine whether a particular content submission should be submitted as a candidate for entry into content market 312. If selected, the content submission may undergo a second evaluation of block 608 using a weight set that is based on manufacturer criteria of block 606.

A similar weighting scheme may be used in block 608 where various evaluation criteria from a manufacturer perspective may be used. For example, manufacturer's criteria may include: a percentage of social network members that voted, types of social network members that voted, the type or genre of the content submission, the historical response to the type or genre of the content submission, the content submissions' similarity to recently released productions, potential costs for producing the content submission, etc. The content manufacturer's criteria and the peer criteria may overlap. However, the weight values are set based on the respective different perspectives. The evaluation process of block 608 may generate manufacturer points which are compared against a second threshold. If manufacturer points of a content submission exceed a second threshold, then the content submission may be placed in content market 312. Otherwise, the content submission may be returned to block 314 for revision or re-creation and comments from both peer and manufacturer evaluations also may be provided as a guide for revisions and/or re-creations.

Figure 7:
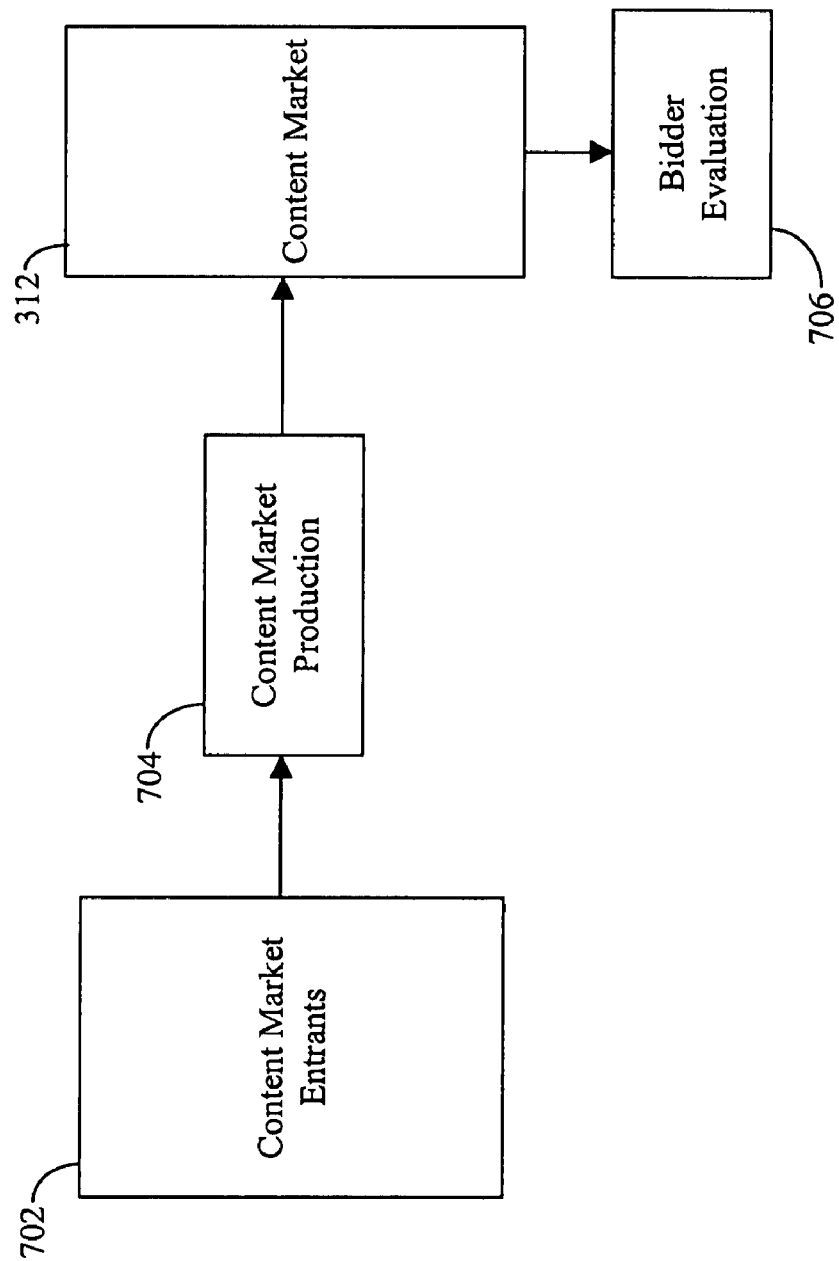
FIG. 7 shows a block diagram of an exemplary process for converting a content submission into a content market product.

After a content submission has been selected as a content market entrant, the content creator 104 may be provided an opportunity to adjust the content submission for a content market production. At this point, content creator 104 may consider putting in more effort and expend more funds in hopes of succeeding as the next hit movie, for example. Content creator 104 may consider obtaining funds from investors in this venture. This investment would most likely not be extremely large such as hundreds of millions of dollars for an actual movie production, for example. However, a few hundred thousand dollars possibly may be invested to generate a real contender for the next box office hit. As shown in FIG. 7, content market entrants 702 are input into block 704 for creation of content market productions. When completed, content market productions may be placed in content market 312 for consideration by content manufacturers 106.

In block 706, potential bidders may access content market 312 to peruse any particular content market production and personally evaluate the creative content. In fact, CM platform 216 may offer information stored in an archive of prior versions starting with the initial entry in the content pool so that a history of development may be considered. This may provide an in-depth understanding of the current status and the total possibilities that the content market production may have and thus its value.

For example, a bidder may not be attracted to the content market production as presented. However, after considering the decisions that were made as may be inferred from past versions, the bidder may come to the conclusion that the basic idea of the content is really good, but the actual content market production suffered from what the bidder may consider as wrong decisions. Thus, the availability of the content market productions and/or archived versions provide in-depth evaluations that increases the accuracy of bidder valuations.

Content market 312 may be managed by CM platform 216 as shown in FIG. 2. CM platform 216 establishes a market environment where potential purchasers such as content manufacturers 106 may interact to set a price for content market productions in content market 312. For example, CM platform 216 may list each of the content market productions much like a stock exchange where each of the content market productions are identified by title along with current valuations such as ask price and bid price.

Figure 8:
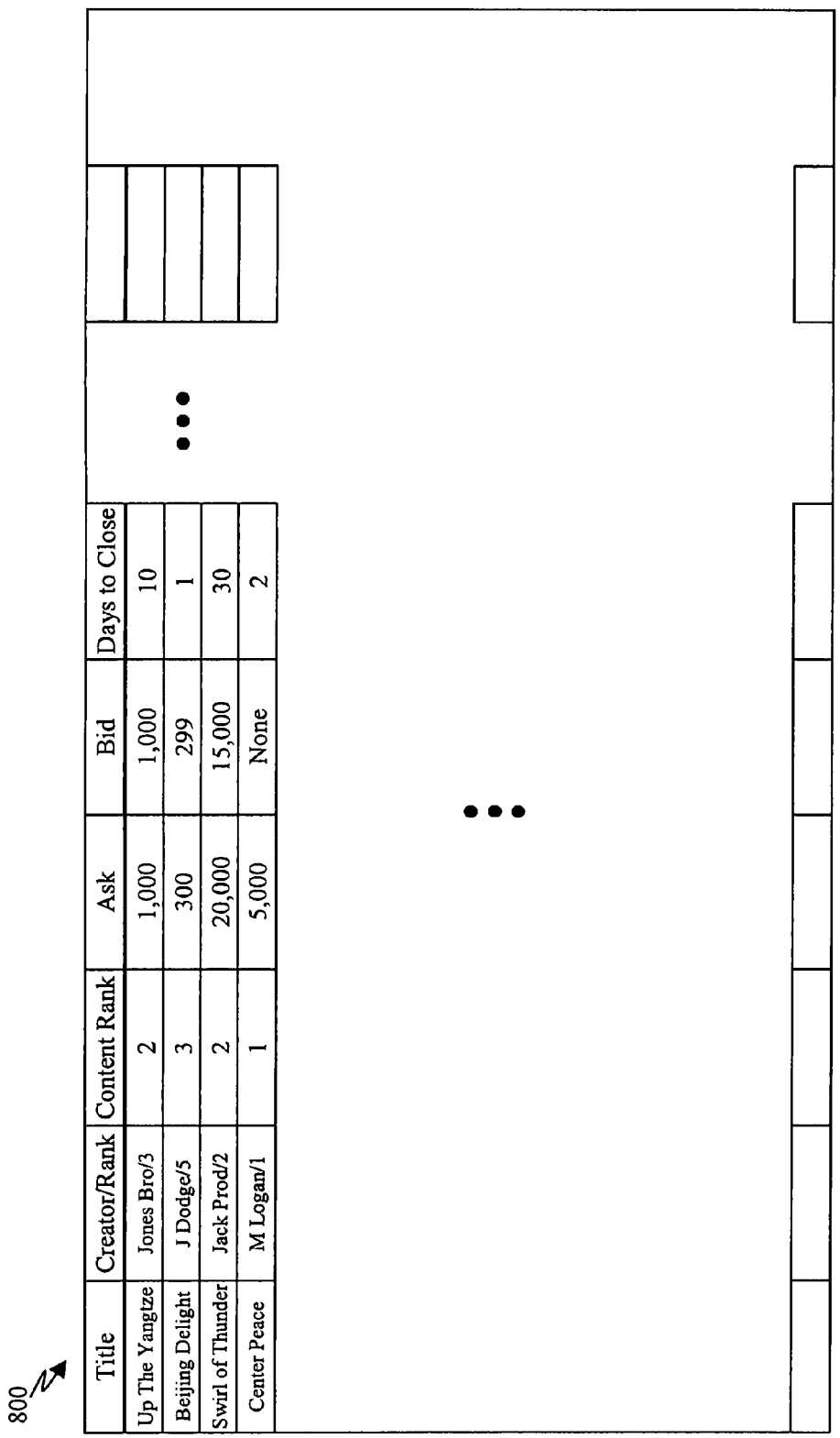
FIG. 8 shows an exemplary diagram of a content market database.

FIG. 8 shows an example of such a listing that may include for each content market production information such as title, creator/rank, content rank, ask price, bid price, days-to-close, etc. The creator/rank may indicate a name of the creator or a name of an organization that created the content market production and the rank may be the rank of the creator. This information may assist content market participants to immediately assess the potential quality of a particular title. The content rank may be added by CM platform 216 based on the evaluation results that a title received during the selection process. Initially, the content creator 104 and/or CM platform 216 may set a starting ask price. The ask price may be set later by the current owner of the title or automatically set by CM platform 216.

As various content market participants review the title and assess the market worth, bid prices may be offered and the highest bid price may be listed in the market listings. The days-to-close indicates a remaining time for bidding on a particular title. For example, 10 days are indicated to be remaining for the title "Up the Yangtze." After the days-toclose goes to zero, the highest bidder becomes the current owner. The winner of the bid may again list the title to content market 312 together with a higher asking price than the winning bid price, if desired. CM platform 216 may set limits to a number of times a title may be listed in content market 312 to maintain freshness of listed titles. In this way, titles in the content market may be traded and the values assigned to each title may be set by content market 312.

CM platform 216 may further provide an ownership structure to current owners of titles to offer shares of ownership to the public much like IPOs in the stock market. For example, the public offerings may set initial prices of offered titles, release dates, share privileges such as possible input to production decisions, etc. For example, content manufacturer 106 that owns the "Up the Yangtze" title may offer a thousand shares where each share is valued at $1.00. The public may purchase and trade these shares and thus set a value for this title. The owners of the shares may be provided a certain percentage of the box office earnings, for example. The content manufacturer 106 may either produce the title on a commit date, or sell the production rights to another content manufacturer 106 for the production. Thus, a title in content market 312 may be subjected to free market forces so that its value may be accurately set.

CM platform 216 may further provide an options like market where the public may speculate on whether values of shares for a particular title may increase or decrease. Thus, calls may be sold for the right to purchase shares of a particular title and puts may be sold for the right to sell shares of a particular title. CM platform 216 may function as an option clearing house and set overall market rules such as commit date of production by content manufacturer 106, option periods, numbers and types of shares that may be sold, rights and privileges for determining parameters for ultimate production of the title, etc. CM platform 216 may provide a listing of prices (high and/or low) for the shares and asking and bidding prices of the options, for example.

Introducing market forces into valuation of titles in content market 312 injects consumer input into values of the titles. Additionally, permitting content manufacturers 106 to sell shares of ownership for the titles spreads production risks and reduces investment costs so that return-on-investments may be better controlled.

Figure 9:
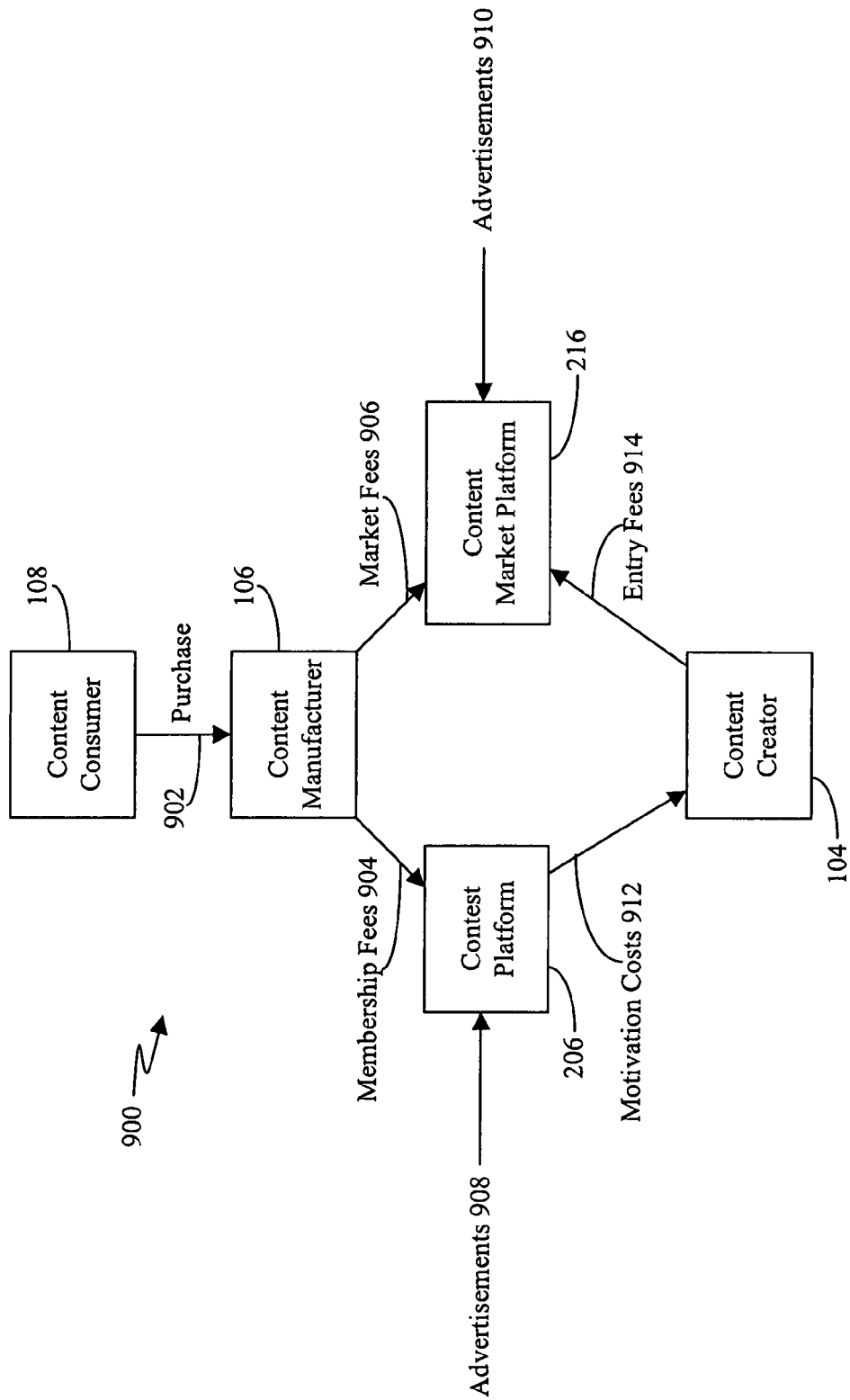
FIG. 9 shows an exemplary money flow block diagram.

FIG. 9 shows a block diagram identifying an exemplary monetary flow within CCMS system 100. Content consumers 108 are the main source of monetary input via purchases 902 of the products of content manufacturers 106. Content manufactures 106 pay market fees 906 to CM platform 216 for participating in content market 312. Content manufacturer 106 may also pay membership fees 904 for gaining rights to input evaluation criteria into CCM platform 206. Membership fees 904 may also provide content manufacturers 106 the privilege of directing subject matter of content submissions by providing an input for formulating content invitations, for example. CCM platform 206 may pay for motivation costs 912 to content creators 104 as monetary rewards associated with contests, for example. CCM platform 206 may feature advertisements 908 and thus receive monetary input from the public.

CM platform 216 may also receive monetary inputs from advertisements 910. CM platform 216 may exact an entrance fee 914 from content creators 104 whose content submissions are admitted into content market 312. Other monetary exchanges may also be supported by CM platform 216 such as brokerage fees for buying, selling or otherwise engaging in content market 312, for example.

Figure 10:
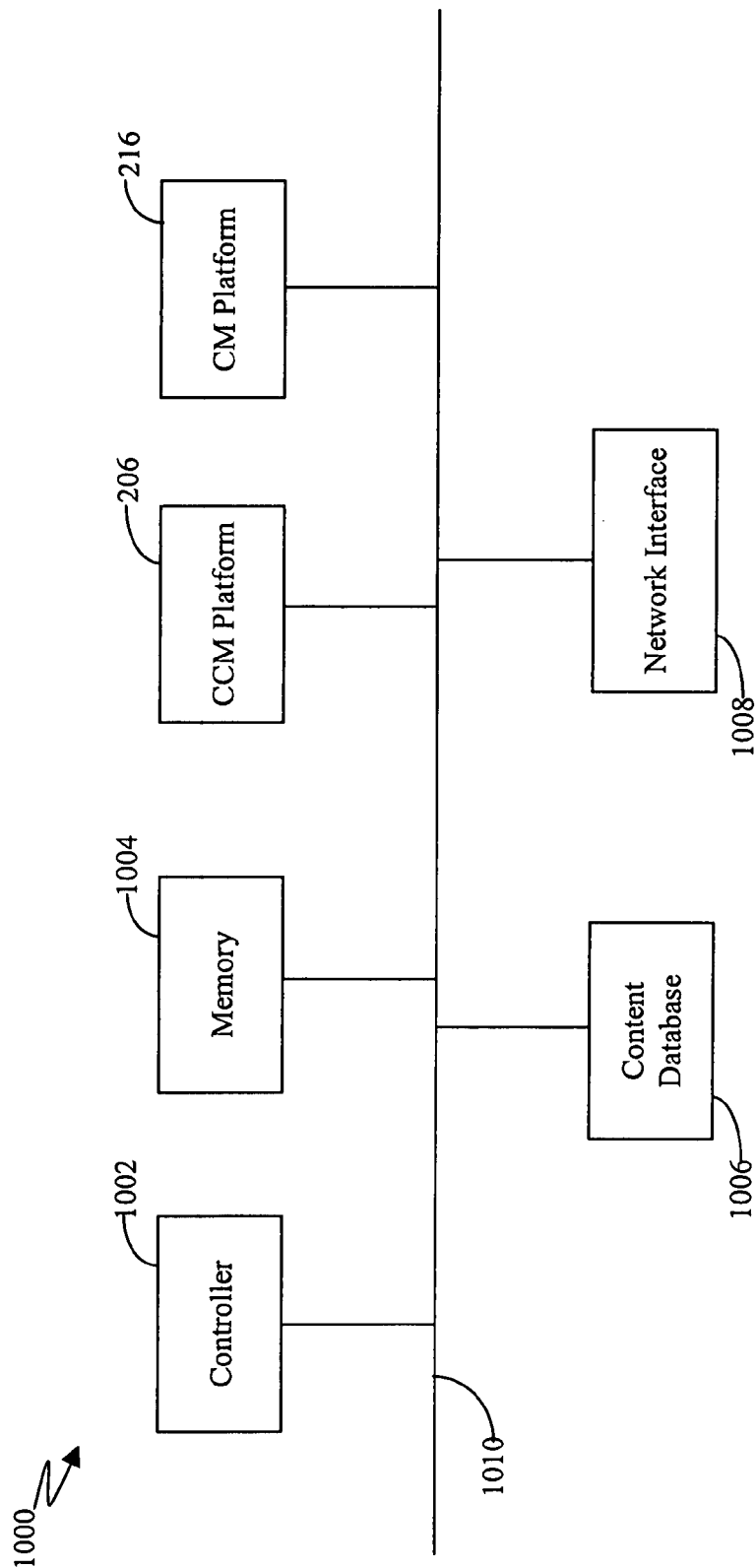
FIG. 10 shows an exemplary block diagram of the content creation, monitoring and selection platform.

FIG. 10 shows an exemplary block diagram 1000 of CCMS platform 110 that may include a controller 1002, a memory 1004, CCM platform 206, CM platform 216, a content database 1006 and a network interface 1008. These components may be coupled together via bus 1010. While block diagram 1000 shows CCMS platform 110 configured in a bus architecture, other types of architectures may also be used. Further, controller 1002, CCM platform 206, CM platform 216 and network interface 1008, may be implemented in using various technologies such as PLAs, PALs, applications specific integrated circuits (ASICs), off the shelf processors, and/or software executed in one or more general purpose or special purpose processors. Memory 1004 and content database 1006 may be implemented using hard disk or optical disk technologies, or RAM/ROM in either volatile or nonvolatile technologies. Additionally, CCMS platform 110 may be either centralized or distributed.

Controller 1002 may perform management tasks of CCMS platform 110 such as registering content creators 104, content manufacturers 106, and other members of social networks and/or content market networks. For example, when a member of the public would like to join one of the social networks by a request from a web page, for example, controller 1002 may engage the prospective member by providing various forms to collect information and to create a profile for the new member. When a content manufacturer 106 desires to join the content market, controller 1002 may communicate with a content manufacturer representative to collect all the information required to be a content market member such as the various privileges that are desired by the content manufacturer. Additionally, controller 1002 may perform the processes for collecting various fees and money exchanges between content creators 104, content manufacturer 106 and transactions exchanged on the content market. Further, controller 1002 may also interact with advertisers, schedule and control various advertisements to be displayed in the different social networks and content market networks.

Controller 1002 may also perform various database maintenance tasks such as updating current information such as days-to-close for various titles in this content market and/or time-to-live parameters associated with various content submissions in the content pool. Of course, many of these tasks may be shared or performed by the CCM or CM platforms 206 or 216, respectively.

Memory 1004 may include information needed by controller 1002, CCM platform 206 and CM platform 216 to perform their respective functions. For example, memory 1004 may store profile information of content creators 104, information related to content manufacturer 106, information related to the content pool and the content market. For example, content pool information shown in FIG. 5 and content market information shown in FIG. 8 may be stored in memory 1004.

Content database 1006 may store the actual content submissions in content market productions including archive of past versions and/or releases. When members of the social network or content market request access, CCM platform 206 and/or CM platform 216 may access the requested information from content database 1006 and output the information for perusal by the requestor. Network interface 1008 interface through network 102 with content creators 104, content manufacturers 106 and/or content consumers 108 and other members of the public curious regarding the features offered by CCMS platform 110.

Figure 11:
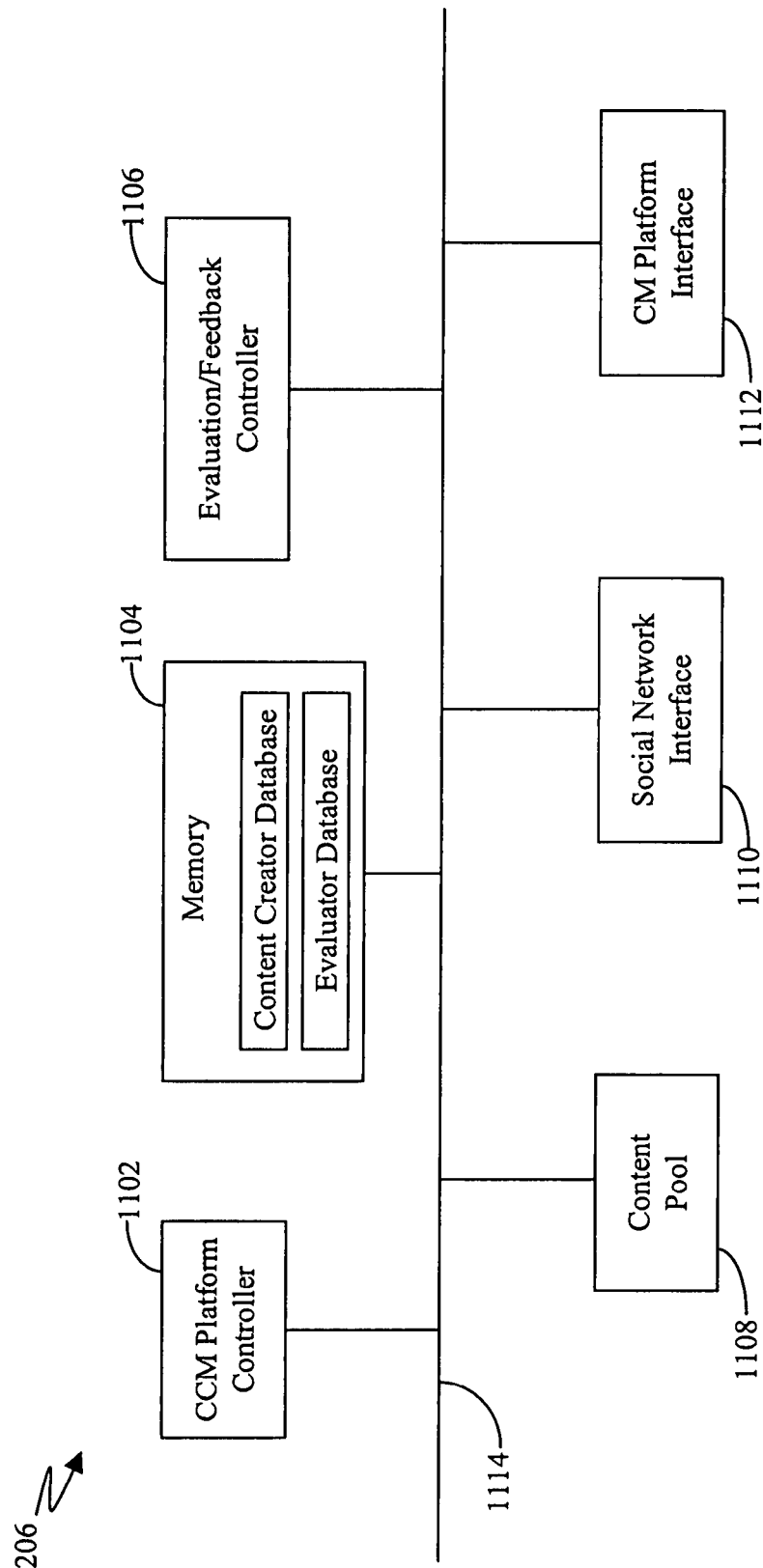
FIG. 11 shows an exemplary block diagram of the content creation and monitoring platform.

FIG. 11 shows an exemplary block diagram for CCM platform 206. CCM platform 206 may include a CCM platform controller 1102, a memory 1104, an evaluation/feedback controller 1106, a content pool 1108, a social network interface 1110, and a CM platform interface 1112. The above components may be coupled together via bus 1114. Similar to the discussion in connection with the CCMS platform 110, CCM platform 206 may be implemented in other than the shown bus architecture, CCM platform controller 1102, evaluation/feedback controller 1106, social network interface 1110, and CM platform interface 1112 may be implemented using various hardware technologies mentioned above and/or performed by software executed on one or more general purpose and/or special purpose computers. Memory 1104 and content pool 1108 may be storage units such as hard disks, optical disks, and/or RAM/ROM implemented using volatile or non-volatile technologies.

CCM platform controller 1102 may manage various activities of content creators 104. For example, CCM platform controller 1102 may manage profiles for each of the content creators 104 and assign grade levels and controls content creator titles, privileges and various access permissions based on the grade levels, for example. Further, CCM platform controller 1102 may introduce various contests by publishing content invitations, as discussed above. Various bulletin boards, publication forum, etc. may be generated and supported by CCM platform controller 1102.

Memory 1104 may store information needed for CCM platform controller 1102 to perform its functions. In particular, memory 1104 may include a content creator database and an evaluator database. The evaluator database may include identification of various content creators 104 and other members of social networks and/or content manufacturers 106 that are given privileges for evaluating various content submissions for various purposes including those associated with contests. The evaluator database and the content creator database may be updated regularly depending on a potentially very dynamic situation such as upgrading evaluators' status, adding new members, etc.

Content pool 1108 may store content submissions made by content creators 104. As discussed above, content pool may include content submissions generated in response to a content invitation for engagement in a contest, for example. Also, content creators 104 may spontaneously engage in content creation as part of social network activity. CCM platform controller 1102 may monitor the submissions placed in content pool 1108 and identify those content submissions that may be of interest to content manufacturers 106, for example, even though the content submissions are not related to any official activities such as a contest. CCM platform controller 1102 may include text, audio and/or image analysis capability to scan for desired concepts or ideas from a list generated based on various sources such as content manufacturers 106 or other investors such as potential purchasers, for example. As various content submissions are identified that match an item on the list, CCM platform controller 1102 may send alerts such as e-mail notifications to interested parties. Once contacted, an interested party may peruse the content submission and take further action such as contact the content creator 104 to make a business arrangement, or take steps necessary to place the content submission in content market 312, for example.

Additionally, CCM platform controller 1102 may comb through content pool 1108 to identify trends based on previously identified features such as genre, techniques, storyline, etc. In this way, CCM platform controller 1102 may identify trends related to various subject matter such as storyline concepts, gaming techniques, electronic circuit design directions, etc. These trends may be formatted for publication by CCM platform controller 1102 and provided to interested parties such as content manufacturers 106 for determining future production directions.

Social network interface 1110 interfaces with the various social networks supported by CCM platform 206. As noted above, different types of social networks may be supported such as for drama, gaming, home security, etc. CM platform interface 1112 may support communications with CM platform 216 if CCM platform 206 and CM platform 216 are different applications. Depending on the implementation, CM platform interface 1112 may be simply a software interface or if CCM platform 206 and CM platform 216 are different hardware units, then CM platform interface 1112 may be a hardware interface connecting to two separate hardware units.

Figure 12:
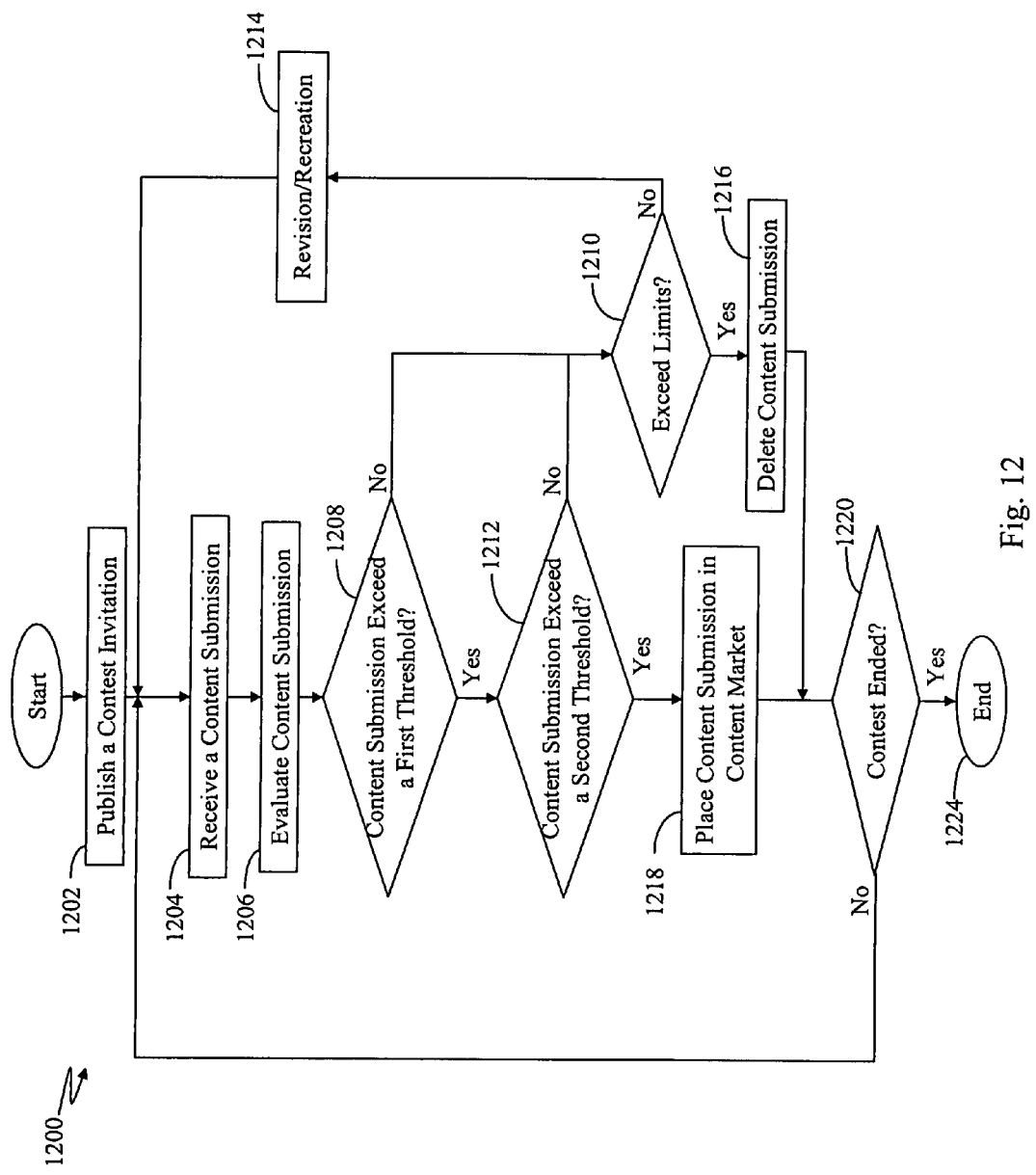
FIG. 12 shows a flowchart for an exemplary contest process performed by the content creation and monitoring platform.

FIG. 12 shows a flowchart 1200 of an exemplary contest process performed by CCM platform 206. In step 1202, CCM platform controller 1102 publishes a contest invitation through social network interface 1110 to content creators 104, and the process goes to step 1204. In step 1204, CCM platform controller 1102 receives content submissions submitted via social network interface 1110, places the content submissions in content pool 1108 and updates content creator database in memory 1104, and goes to step 1206. In step 1206, CCM platform controller 1102 sends messages to evaluation/feedback controller 1106 to evaluate any new content submissions. Evaluation/feedback controller 1106 may notify various evaluators based on the evaluator database and memory 1104 for explicit evaluations. As noted above, any member of a social network may spontaneously provide evaluations. Such evaluations may be received by evaluation/feedback controller 1106 via social network interface 1110 and the evaluations may be analyzed and processed, and the results of the evaluations may be compiled in a database and stored in memory 1104. The process then goes to step 1208.

In step 1208, the evaluation/feedback controller 1106 analyzes the submitted evaluation based on peer weights, as discussed above. If peer points for the content submission exceeds a first threshold, then the process goes to step 1212; otherwise, the process goes to step 1210. In step 1210, the process determines whether the content submission has exceeded any of the established limits. For example, if the CCM platform controller 1102 has set a maximum number of revisions and the content submission has been revised more than the maximum number, then the process goes to step 1216; otherwise, the process goes to step 1214 to inform the content creator 104 that the content submission did not exceed the first threshold and provide any comments that may have been collected for further revisions/creations. In step 1216, the process deletes the content submission from the content pool, and goes to step 1220. After step 1214, the process returns to step 1204.

In step 1212, the evaluation/feedback controller 1106 may further evaluate the content submission based on manufacturer weights to generate content manufacturer points, for example. If the content manufacturer points exceeds a second threshold, the process goes to step 1218; otherwise, the process goes to step 1210. In step 1218, the process places the content submission in the content market and goes to step 1220. In step 1220, the process determines whether the contest has ended. If the contest has ended, the process goes to step 1224 and ends; otherwise, the process returns to step 1204 to receive another content submission if submitted.

Figure 13:
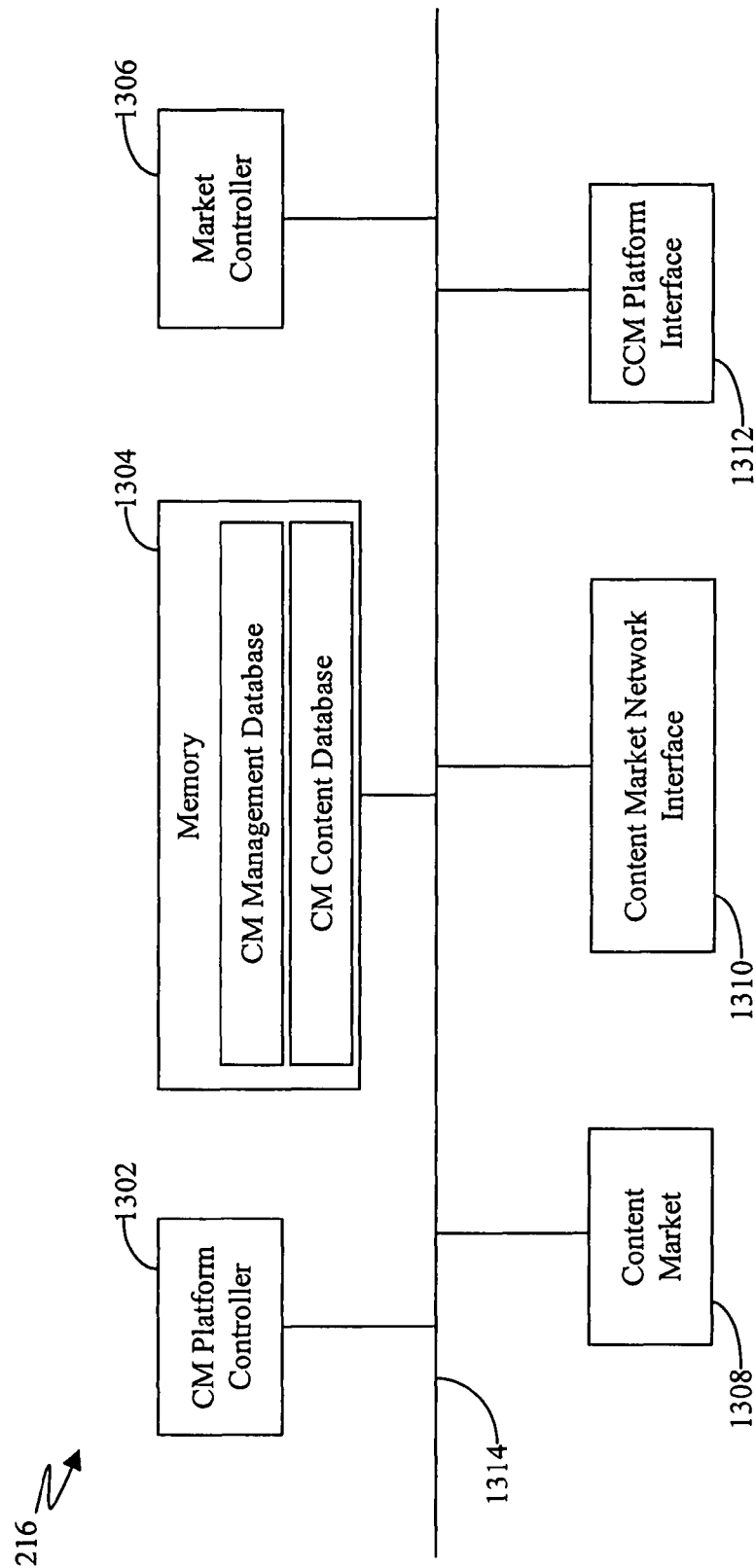
FIG. 13 shows an exemplary block diagram of the content market platform.

FIG. 13 shows a more detailed block diagram for CM platform 216. CM platform 216 may include a CM platform controller 1302, a memory 1304, a market controller 1306, a content market 1308, a content market interface 1310 and a CCM platform interface 1312. The above components may be coupled via bus 1314. Again, while a bus architecture is shown, other hardware configurations may be used and the various components may be implemented by well known hardware technologies and/or software executing on one or more general purpose or special purpose processors.

CM platform controller 1302 may perform various administrative tasks necessary to maintain content market 1308. For example, a content market management database (CM management database) and a content market content database (CM content database) may be managed and stored in memory 1304. Additionally, CM platform controller 1302 may maintain a list of content market participants such as content manufacturers 102. While FIG. 2 only shows content manufacturers 106 connected to content market network 202, anyone in the public may participate. Also, as new content market productions are generated by the CCM platform 206, CM platform controller 1302 may update content market 1308 and its associated listings. Also, CM platform controller 1302 may interface with CCM platform 206 via CCM platform interface 1312 to receive new content market productions and send content manufacturer's input for operation of CCM platform functions, for example. CM platform controller 1302 also may interface with other parties in the public for activities such as advertisements, etc., for example.

Market controller 1306 controls the operations of the content market 1308 in connection with buying and selling various content market productions, managing sales and purchase of shares of content market productions and/or options related to the content market productions. For example, market controller 1306 may keep track of the latest ask and bid prices of each content market production, and maintain values of shares and options related to the shares. Market controller 1306 may also maintain data on price histories for the items in content market 1308 and provide the price histories and any additional analysis results relating to investments in content market products to subscribers.

Figure 14:
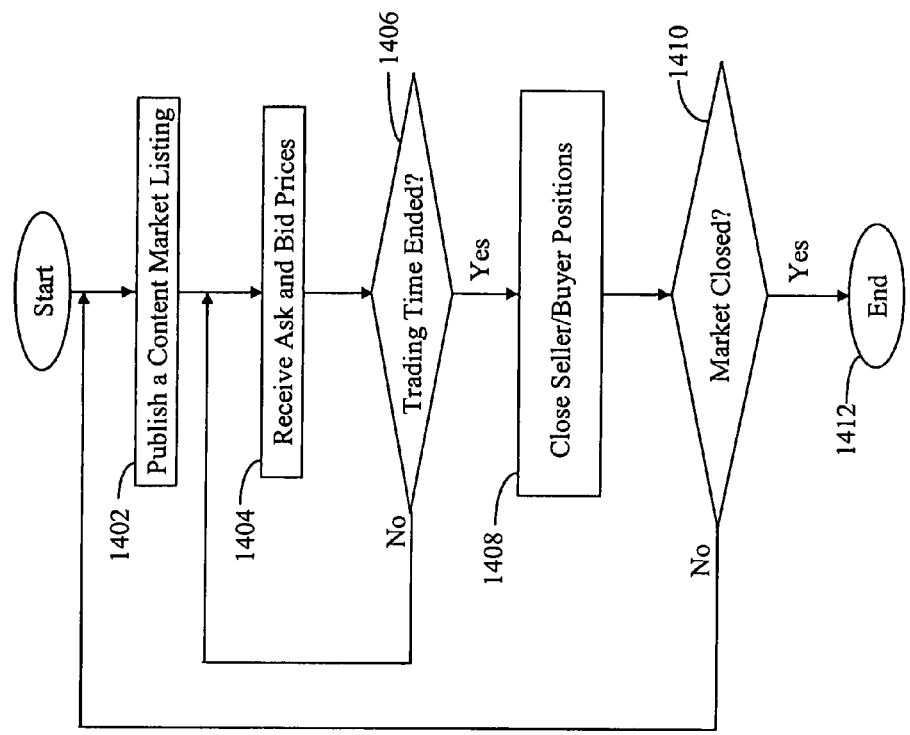
FIG. 14 shows a flowchart of an exemplary process of the content market platform.

FIG. 14 shows a flowchart 1400 of an exemplary process for operating a content market. In step 1402, market controller 1306 may publish a content market listing via content market network interface 1310 to content market participants, and the process goes to step 1404. In step 1404, market controller 1306 may receive ask and/or bid prices for different ones of the content market productions and update CM content database stored in memory 1304, and the process goes to step 1406. In step 1406, the process determines whether the trading time for a particular content market production has ended. As discussed above, each content market production may be associated with a period of time where an auction like process may occur. When the time period has ended, the highest bidder becomes the newest owner of the content market production. If the trading time has ended, the process goes to step 1408; otherwise, the process returns to step 1404.

In step 1408, the market controller 1306 closes the seller/buyer positions and settles accounts and goes to step 1410. In step 1410, the process determines whether the market is closed. If closed, the process goes to step 1412 and ends; otherwise, the process returns to step 1402.

While the above discussion focused on generating new content, many content manufacturers 106 have inventories of previously created content. For example, the movie industry have very large collections of past movies, scripts, TV productions, etc. Content manufacturers 106 may determine the value of their inventories using the CCMS system 100 by taking actions such as injecting a short representative clip of an inventory content into a social network and monitoring the reactions from the social network members, instituting a contest using the subject of an inventory content as the content invitation, comparing an inventory content with trend data supplied by CCM platform 206, generating a corresponding content market product and place it in the content market, etc. The results of these actions may then be measured against an inventory criteria.

For example, if the "One Day in China" content invitation was the title of an inventory content of a content manufacturer 106, then a clip of the inventory by this title may also be added to the contest as a test content submission. If the voting and evaluation results for the test content submission are very low compared to an inventory threshold, i.e., not well received, then the content manufacturer 106 may choose to not produce a re-run, a seequal, or a new release of the same title, for example. The results may be so low that it is below a eliminate threshold. In this case, the inventory content may be sold or simply deleted making room for other titles that are determined to have higher worth.

However, if the voting and/or evaluation results are favorable, then the content manufacturer 106 may decide to re-introduce the title on the market as is and restock more copies such as CDs, DVDs, etc., or to engage in an updated reproduction. Thus, CCMS system 100 may be used as a worth validation system for inventory content.

In view of the above, content manufacturers 106 may have an inventory valuation platform, having a structure similar to the CCM and CM platforms 206 and 216, through which content manufacturers 106 may use to select inventory contents to be evaluated using CCMS system 100. Also, the inventory valuation platform may scan through an inventory of content manufacturers 106 on a periodic basis and assign a valuation of inventory content so that content manufacturers 106 may quickly rank the inventory content and make business decisions regarding future productions based on the inventory content and regarding management of the inventory content.

While the invention has been described in conjunction with exemplary embodiments, these embodiments should be viewed as illustrative, not limiting. Various modifications, substitutes, or the like are possible within the spirit and scope of the invention.

What is claimed is:

1. A content creation, monitoring and selection system that establishes a social network community of content creators to generate one or more content submissions, the system comprising:

a content creation and monitoring (CCM) platform;

a software structure of a plurality of grade levels and a plurality of criteria, at least one criterion being established for each of the grade levels, and a criterion of one grade level being different from a criterion of another grade level, wherein the CCM platform is configured to assign a grade level to a content creator based on a criterion established for the grade level to enforce the software structure; and a first threshold and a second threshold, wherein the CCM platform is configured to:

generate a peer point value determined from a peer perspective of content creators for each content submission of one or more content submissions based on evaluations, generate a manufacturer point value from a manufacturer perspective based on manufacturer evaluations for only a content submission of the content submissions whose peer point value exceeds the first threshold, and select each content submission of the content submissions whose manufacturer point value exceeded the second threshold as a candidate for a content market.

2. The system of claim 1 further comprising:
a content market (CM) platform, coupled to the CCM platform, that establishes a content market; and
a content pool that includes the content submissions, wherein the CCM platform analyzes evaluations of a particular content submission in the content pool, and selects the particular content submission for entry into the content market based on an analysis result of the particular content submission.

3. The system of claim 2, wherein:
the CM platform maintains a CM management database and a CM content database, wherein the CM management database includes identification of admitted participants of the content market and the CM content database includes identification of content market productions which are ones of the content submissions that have been added to the content market.

4. The system of claim 2, further comprising:
a content market production trading system established by the CM platform, the content market production trading system receiving an asking price and a bidding price, and setting a trading time period for each of the content market productions; and
a content market listing that publishes latest asking and bidding prices and a trading time remaining for each of the content market productions.

5. The system of claim 2, further comprising:
an ownership system providing an ownership division of a content market production into one or more shares where a portion of the shares may be offered for sale in the content market, the CM platform listing a price of the shares in a content market listing.

6. The system of claim 2, further comprising:
call and/or put options supported by the CM platform for rights to buy or sell shares of content market productions in the content market.

7. The system of claim 2, wherein the content submissions are evaluated based on at least one of novelty, emotional content, violence, intrigue, complexity, level of creativity, market trend of this type of content, opinions of professional content creators, quality, quality of story line, level of creativity, presentation quality, usefulness, emotional quality, a percentage of social network members that voted, types of social network members that voted, the type or genre of the content submission, the historical response to the type or genre of the content submission, the content submissions' similarity to recently released productions, potential costs for producing the content submission.

8. The system of claim 1 further comprising:
a content creator database that stores first information relating to each of the content creators;
an evaluator database that stores second information relating to each of the evaluators, wherein evaluators also can be a content creator;
content creator profiles that are included in the first information, each of the content creator profiles containing a content creator identification, a grade level, and identification of one or more content submissions; and
evaluator profiles that are included in the second information, each of the evaluator profiles containing an evaluator identification, a status level, and identification of any content submissions being evaluated.

9. The system of claim 1, wherein:
the CCM platform introduces an invitation to the social network community for a contest that includes a list of desired contents, monitors a content pool to identify one or more content submissions that correspond to items in the list of desired contents, and receives votes and evaluations from members of the social network community relating to a content submission submitted for the contest.

10. The system of claim 9, wherein:
the CCM platform assigns a rank to the content submission relative to other content submissions submitted for the contest based on the votes and evaluations, and assigns one or more rewards to a content creator of the content submission based on the rank, the rewards including one or more of status designation, money, one or more special privileges, and recommendation for further consideration in forums other than the contest.

11. The system of claim 1, wherein a criterion of a grade level for a content creator is a financial success of a content submission of the content creator.

12. The system of claim 1, wherein the CCM platform enforces a revision process before publication of a content submission in the social network community, the CCM platform limiting a number of revisions that revises a content submission for content appropriateness and operability.

13. The system of claim 1, wherein each criterion is based on one or more achievements of a content creator in connection with a content submission.

14. The system of claim 1 further comprising a plurality of types of criteria, at least one type of criterion being established for each of the grade levels, and a type of criterion of a higher grade level being different from all types of one or more criteria of a lower grade level.

15. A method performed by a content creation, monitoring and selection (CCMS) platform that establishes a social network community of content creators to generate one or more content submissions, the CCMS platform includes a content creation and monitoring (CCM) platform, the method comprising:
establishing a software structure of a plurality of grade levels and a plurality of criteria;
establishing at least one criterion for each of the grade levels, a criterion of one grade level being different from a criterion of another grade level;
assigning by the CCM platform a grade level to a content creator based on one or more criteria established for the grade level to enforce the software structure; and
generating a peer point value obtained based on a peer perspective of content creators for each of the content submissions based on evaluations;
selecting by the CCM platform content submissions whose peer point value exceeds a first threshold to be first content submissions; and
generating by the CCM platform a manufacturer point value obtained from a manufacturer perspective based on manufacturer evaluations for only the first content submissions, wherein the CCM platform selects each of the first content submissions whose manufacturers point value exceeds a second threshold to be candidates for content market productions.

16. The method of claim 15, further comprising:
establishing a content pool of the content submissions; and
evaluating a content submission in the content pool to generate one or more evaluations; and
processing by the CCM platform the evaluations to set a rank of the content submission.

17. The method of claim 16, further comprising:
receiving a list of desired contents; then
performing one or more of text analysis, audio analysis, and image analysis on the content submissions in the content pool; and
identifying by the CCM platform one or more content submissions in the content pool that correspond to items in the list based on results of the performing step.

18. The method of claim 15, further comprising:
introducing a content invitation in the social network community;
collecting content submissions directed to the content invitation;
voting by members of the social network community; and
ranking the collected content submissions based on results of the voting.

19. The method of claim 15, wherein the CCMS platform further includes a content market (CM) platform, the method further comprising:
establishing a content market for public trading;
establishing an asking price for a content market production;
receiving a bidding price for the content market production;
listing a highest bidding price for the content market production; and
awarding by the CM platform the content market production to a highest bidder.

20. The method of claim 15, wherein the CCMS platform further includes a content market (CM) platform, the method further comprising:
establishing a content market for public trading;
dividing ownership of a content market production into a plurality of shares; and
placing the shares in the content market; and
listing by the CM platform one or more of a high price and a low price for the shares based on trading of the shares for each listing period.

21. The method of claim 20, further comprising:
establishing an options clearing center; and
receiving contracts for call and put options having contract prices set based on prices of underlying shares of content market productions.

22. The method of claim 15, wherein the CCMS platform further includes a content market (CM) platform, the method further comprising:
establishing a content market for one or more content market productions corresponding to one or more content submissions; and
setting values for the content market productions to support public trading in the content market.

23. A content creation, monitoring and selection system that establishes a social network community of content creators to generate content submissions, the system comprising:
a content creation and monitoring (CCM) platform; and
a content market (CM) platform coupled to the CCM platform that establishes a content market, the CCM platform configured to place one or more of the content submissions in the content market if the CCM platform determines that the content submissions exceeds thresholds associated with two evaluations, wherein a first evaluation is based on peer criteria of content creators, only content submissions having first evaluation results that exceed a first threshold are considered for a second manufacturer evaluation based on manufacturer's criteria, and only content submissions having second evaluation results that exceed a second threshold are placed in the content market.

24. A content creation, monitoring and selection system that establishes a social network community of content creators to generate one or more content submissions, the system comprising:
a content creation and monitoring (CCM) platform;
a software structure of a plurality of grade levels and a plurality of criteria, each of the criteria being based on one or more achievements of a content creator in connection with one or more content submissions, at least one criterion being established for each of the grade levels, and a criterion of a higher grade level being different from all one or more criteria of a lower grade level, wherein the CCM platform is configured to assign a grade level to a content creator based on one or more criteria established for the grade level to enforce the software structure; and
a first threshold and a second threshold,
wherein the CCM platform is configured to:
generate a peer point value determined from a peer perspective of content creators for each content submission of one or more content submissions based on evaluations,
generate a manufacturer point value from a manufacturer perspective based on manufacturer evaluations for only a content submission of the content submissions whose peer point value exceeds the first threshold, and
select each content submission of the content submissions whose manufacturer point value exceeded the second threshold as a candidate for a content market.

25. The system of claim 24, wherein:
a content market (CM) platform, coupled to the CCM platform, that establishes a content market;
a content pool that includes the content submissions, wherein the CCM platform analyzes evaluations of a particular content submission in the content pool, and selects the particular content submission for entry into the content market based on an analysis result of the particular content submission; and
the CM platform maintains a CM management database and a CM content database, the CM management database including identification of admitted participants of the content market and the CM content database including identification of content market productions which are ones of the content submissions that have been added to the content market.

26. The system of claim 24, further comprising:
a content pool that includes the content submissions, wherein the CCM platform analyzes evaluations of a particular content submission in the content pool, and selects the particular content submission for entry into the content market based on an analysis result of the particular content submission;
a content market production trading system established by the CM platform, the content market production trading system receiving an asking price and a bidding price, and setting a trading time period for each of the content market productions; and
a content market listing that publishes latest asking and bidding prices and a trading time remaining for each of the content market productions.

27. The system of claim 24, further comprising:
a content pool that includes the content submissions, wherein the CCM platform analyzes evaluations of a particular content submission in the content pool, and selects the particular content submission for entry into the content market based on an analysis result of the particular content submission; and an ownership system providing an ownership division of a content market production into one or more shares where a portion of the shares may be offered for sale in the content market, the CM platform listing a price of the shares in a content market listing.

\* \* \* \* \*